(12) United States Patent
Ayazi (10) Patent No.: US 9,279,824 B2
(45) Date of Patent: *Mar. 8, 2016

(54) BULK ACOUSTIC WAVE ACCELEROMETERS

(71) Applicant: Georgia Tech Research Corporation, Atlanta, GA (US)

(72) Inventor: Farrokh Ayazi, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,184

(22) Filed: Sep. 9, 2013

(65) Prior Publication Data

US 2014/0102197 A1 Apr. 17, 2014

Related U.S. Application Data

(63) Continuation of application No. 12/249,601, filed on Oct. 10, 2008, now Pat. No. 8,528,404.

(60) Provisional application No. 60/979,131, filed on Oct. 11, 2007.

(51) Int. Cl.
  *G01P 15/097* (2006.01)

(52) U.S. Cl.
  CPC .......... *G01P 15/0975* (2013.01); *G01P 15/097* (2013.01)

(58) Field of Classification Search
  CPC ..................................... G01P 15/097
  USPC ............................ 73/514.29, 514.28, 514.34
  See application file for complete search history.

(56) References Cited

U.S. PATENT DOCUMENTS 4,805,456 A * 2/1989 Howe et al. ................ 73/514.18
6,958,566 B2 * 10/2005 Nguyen et al. ............... 310/321

* cited by examiner

*Primary Examiner* — John Chapman, Jr.
(74) *Attorney, Agent, or Firm* — Burns & Levinson LLP; Bruce D. Jobse (57) ABSTRACT

Accelerometers and associated techniques for detecting motion are described. For a resonant accelerometer, an externally-applied acceleration can cause a change in the electrical spring constant $K_e$ of the electromechanical system. A resonant accelerometer can be driven to resonate in a bulk acoustic wave mode of vibration, which can have a high resonant frequency. Other accelerometers and associated techniques are disclosed.

8 Claims, 8 Drawing Sheets

BULK ACOUSTIC WAVE ACCELEROMETERS

RELATED APPLICATION

This application claims priority under 35 U.S.C. §119(e) to U.S. Provisional Application Ser. No. 60/979,131, entitled "MULTI-AXIS CAPACITIVE BULK ACOUSTIC WAVE ACCELEROMETERS," filed on Oct. 11, 2007, which is herein incorporated by reference in its entirety.

DISCUSSION OF RELATED ART

Accelerometers are devices that can be used to sense or measure acceleration along or around one or more axes. Some applications of accelerometers include sensors for automobile air bag deployment, and portable electronic devices such as video game controllers. Accelerometers that are small in size are known as microaccelerometers. At least two types of microaccelerometers exist in the market space today that use different techniques for measuring external acceleration.

One class of conventional microaccelerometers sense acceleration by measuring changes in the displacement of a proof mass caused by an externally-applied acceleration. This displacement is typically measured capacitively by detecting a change in the size of the capacitive gaps or a change in the amount of capacitive overlap area, when the proof mass is displaced by an externally applied acceleration. Accelerometers in this class are known as static accelerometers.

Another class of accelerometers, known as resonant accelerometers, sense acceleration by exciting a micromechanical structure into its resonant frequency. The accelerometer natural angular frequency may be expressed by $\omega_0 \sqrt{K/M}$, where M is the proof mass of the accelerometer, and K is the effective spring constant of the accelerometer. The accelerometers are typically designed such that $K_{electrical} \ll K_{mechanical}$. When an external acceleration is applied, the mechanical stiffness or mechanical spring constant ($K_{mechanical}$) changes as a result of the structural strain imposed by the external acceleration. Acceleration can be detected based on a change in the resonant frequency that is caused by the change in the mechanical spring constant $K_{mechanical}$. Accelerometers in this class are known as resonant accelerometers.

SUMMARY

Some embodiments relate to resonant accelerometers having an electromechanical system that resonates in a bulk acoustic wave mode of vibration. A bulk acoustic wave mode of vibration may have a resonant frequency on the order of 1 MHz to 50 MHz, for example. An acceleration-induced change in the electrical spring constant $K_{electrical}$ or a related parameter may be used to measure acceleration. In some embodiments, when an external acceleration is applied, the resonant frequency of the system may change in response to a change in the electrical spring constant $K_{electrical}$. The change in the electrical spring constant $K_{electrical}$ may result from a change in the size of the capacitive gap between the electrode(s) and a resonator element. In some embodiments, the mechanical spring constant of the accelerometer may be substantially constant during acceleration-induced motion of the resonator element such that the overall change in K is caused by changes in $K_{electrical}$.

Some embodiments relate to "static," resonant, or bulk acoustic wave accelerometers in which a proof mass is suspended above a substrate by a suspension system. The suspension system may include both z-axis suspension tethers and x-y axis suspension tethers mechanically coupled to the z-axis suspension tethers. The x-y axis suspension tethers may be suspended from the z-axis suspension tethers, and the proof mass may be suspended from the x-y axis suspension tethers.

Some embodiments relate to an accelerometer that includes a resonator element configured to vibrate along a first axis in a bulk acoustic wave mode at a resonant frequency. At least one electrode is coupled to the resonator element to excite the resonator element to vibrate along the first axis in the bulk acoustic wave mode at the resonant frequency, and to detect a measurement signal.

Some embodiments relate to an accelerometer that includes a resonator element having a resonant frequency of at least about 1 MHz. The resonator element is configured to vibrate along a first axis. At least one electrode is coupled to the resonator element to excite the resonator element to vibrate along the first axis at the resonant frequency, and to detect a measurement signal.

Some embodiments relate to a method of measuring motion using an electromechanical resonator having a resonant frequency and an electrical spring constant. The electromechanical resonator may include a resonator element. The resonator element is driven to vibrate along a first axis at the resonant frequency. Motion is measured along the first axis based on a change in the electrical spring constant of the electromechanical resonator.

Some embodiments relate to an accelerometer for measuring motion in any of a plurality of axes comprising an x-axis, a y-axis, and a z-axis. The accelerometer includes a substrate defining a plane of the x-axis and the y-axis, and a proof mass suspended above the substrate by a suspension system. The suspension system includes at least one first suspension member configured to allow motion of the proof mass along the z-axis. The suspension system also includes at least one second suspension member configured to allow motion of the proof mass along the x-axis and/or the y-axis, the at least one second suspension member being mechanically connected to the at least one first suspension member. The at least one second suspension member is suspended from the at least one first suspension member.

BRIEF DESCRIPTION OF DRAWINGS

The accompanying drawings are not intended to be drawn to scale. In the drawings, each identical or nearly identical component that is illustrated in various figures is represented by a like reference character. For purposes of clarity, not every component may be labeled in every drawing. In the drawings.

DETAILED DESCRIPTION

The techniques described herein relate to accelerometers and to associated techniques for detecting and measuring motion. Some embodiments relate to a resonant accelerometer having a resonating electromechanical system, in which an externally-applied acceleration causes a change in the electrical spring constant $K_{electrical}$ of the electromechanical system. Acceleration can be measured by sensing a resulting change in the resonant frequency of the electromechanical system, and/or a change in another property such as the phase of a signal received from the electromechanical system, in some embodiments of resonant accelerometers, the accelerometer can be driven to resonate in a bulk acoustic wave (BAW) mode of vibration, which may have a high resonant frequency on the order of 1 MHz to 50 MHz, for example.

Electromechanical systems have both mechanical properties and electrical properties. One type of electromechanical system is a microelectromechanical resonator that is electrically driven to vibrate at its resonant frequency. For some microelectromechanical resonators, the mechanical stiffness of the resonator may be modeled as a mechanical spring constant $K_m$, which is a parameter that may be used to model lumped linear systems. A resonator with a large value of $K_m$ is relatively mechanically stiff, and conversely, a resonator with a small value of mechanical spring constant $K_m$ is more compliant. Such a microelectromechanical resonator also has an electrical stiffness that may be modeled as an electrical spring constant $K_e$, which is another parameter that may be used to model lumped linear systems. The electrical spring constant $K_e$ may represent the strength of the electrical coupling in the system. Some microelectromechanical resonators are electrically driven using capacitive coupling, in which a voltage difference between two charged objects, spaced apart by a gap, creates a coulomb force tending to pull the objects together. In an electromechanical system with capacitive coupling, the electrical spring constant $K_e$ may be affected by the size of the gap, the applied voltage and/or other parameters. Reducing the size of the gap tends to increase the strength of the capacitive coupling, which may cause an increase in the electrical spring constant $K_e$.

In some electromechanical systems, the overall stiffness of the electromechanical system may be represented by an electromechanical spring constant $K_{em}$ that is a combination of the electrical spring constant $K_e$ and the mechanical spring constant $K_m$, according to the relation $K_{em}=K_m-K_e$. In such an electromechanical system, the resonant frequency of the resonator may be proportional to the square root of the electromechanical spring constant $K_{em}$.

As discussed above, prior resonant accelerometers sensed acceleration by detecting a change in the resonant frequency of the resonator caused by a change in the mechanical spring constant $K_m$. These prior resonant accelerometers were designed so that an externally-applied acceleration would induce mechanical strain that changed the mechanical spring constant $K_m$, which led to a change in the resonant frequency, which could be measured to sense acceleration.

Some embodiments of the techniques described herein relate to resonant accelerometers having an electromechanical resonator that can detect acceleration through a change in the electrical spring constant $K_e$. Acceleration and/or other motion parameters can be sensed by measuring a change in the resonant frequency, a phase change in a measured signal received from the electromechanical resonator, or a change in another suitable parameter that may be linked to the change in the electrical spring constant $K_e$. In some embodiments, the mechanical spring constant $K_m$ of the system may be substantially fixed or so that it does not change, and thus the mechanical spring constant $K_m$ may have no substantial effect can a change in the resonant frequency or other parameters in response to an externally-applied acceleration.

Some embodiments relate to a capacitive bulk acoustic wave resonant accelerometer. A capacitive bulk acoustic wave resonant accelerometer may be described as a resonant accelerometer that uses capacitive driving and/or sensing of a bulk acoustic wave mode of vibration to measure acceleration. A bulk acoustic wave (BAW) mode can be described as a mode of vibration that extends substantially throughout the bulk portion of a resonating element, for example the proof mass or the seismic mass of the accelerometer. The capacitive excitation of a bulk acoustic wave may eliminate the need for a piezoelectric material in the structure of the accelerometer. This in turn may enable the photolithographic manufacturing of bulk acoustic wave accelerometers in widely available substrates such as silicon wafers or silicon-on-insulator (SOI) wafers. An example of a bulk acoustic wave mode of vibration is shown in FIG. 2 and discussed further below. Arrows are shown in FIG. 1 to represent the bulk acoustic wave mode of vibration.

Figure 1:
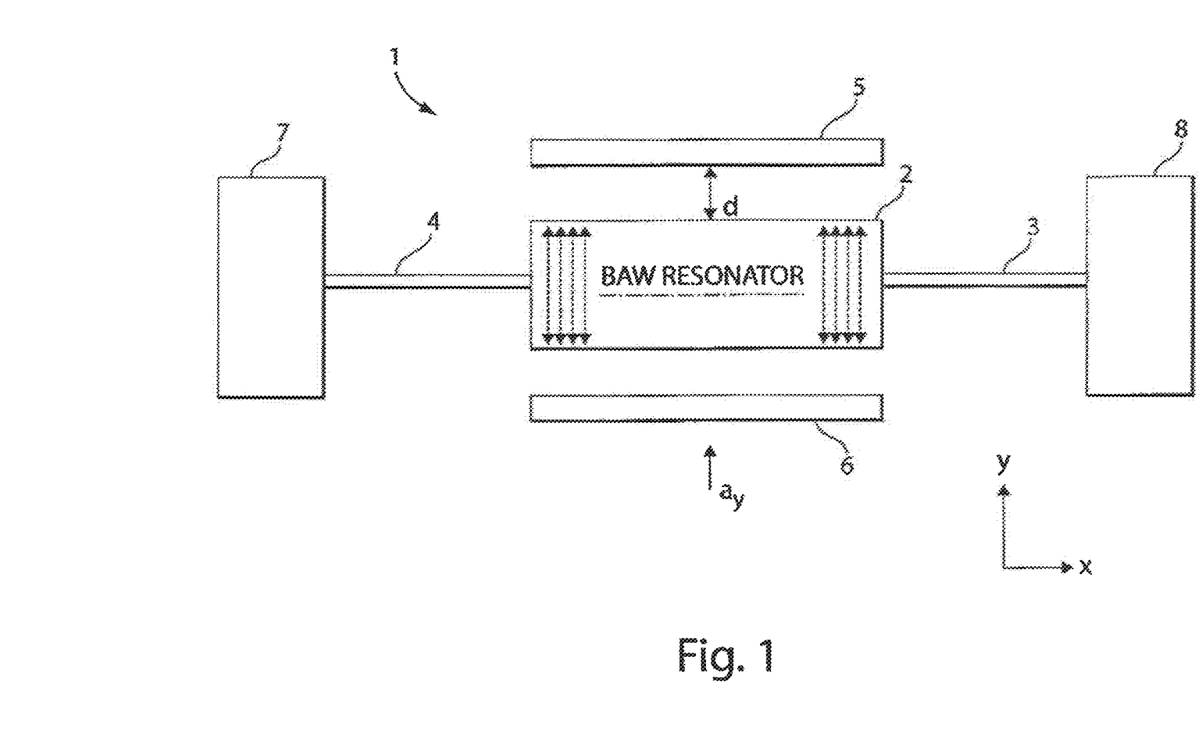
FIG. 1 shows a bulk acoustic wave resonant accelerometer, according to some embodiments.
Figure 2A:
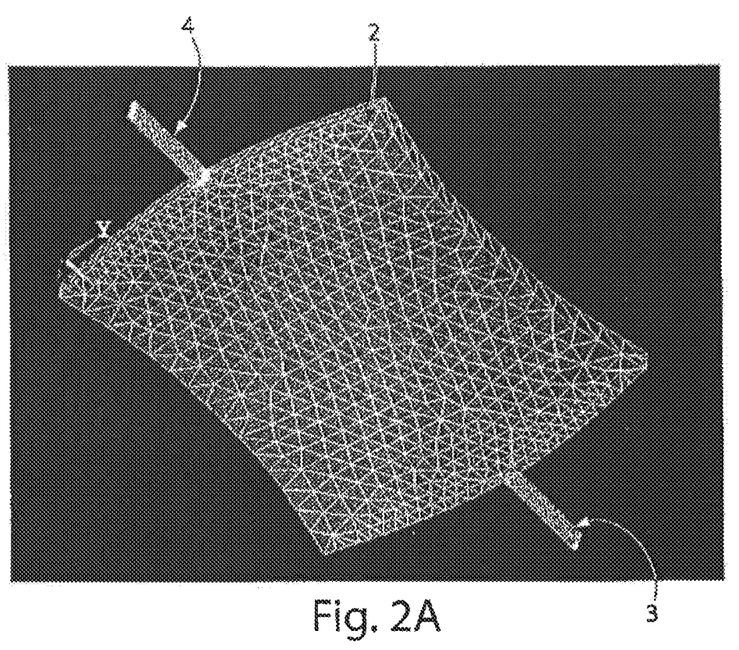
FIGS. 2a-2b illustrate a bulk acoustic wave mode of vibration of a resonating element.
Figure 2B:
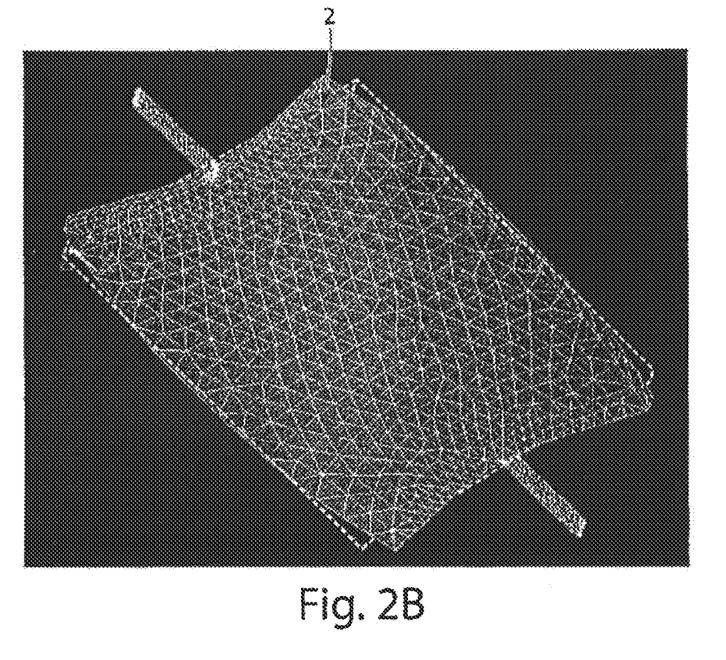

FIG. 1 shows a top view of a bulk acoustic wave resonant accelerometer 1 for measuring acceleration along a first axis, according to some embodiments. Accelerometer 1 includes a resonator element 2 that may be driven to resonate in a bulk acoustic wave mode of vibration. Resonator element 2 may be a proof mass that is square or rectangular shape in top view, as shown in FIG. 1, and may have a relatively small height along the z-axis direction (not shown in FIG. 1) compared to its width and length in the x-axis and y-axis directions, respectively. For example, the height of the resonating element may be between 20 μm and 100 μm, and the width and/or length may be on the order of hundreds of microns, such between 300 μm and 800 μm, although other suitable dimensions may be used. Resonator element 2 may be formed to have other suitable shapes and dimensions, such as a circular shape, as the invention is not limited to the particular shapes or dimensions of resonator element 2.

Resonating element 2 may be suspended in air (or vacuum, or another gas) by support tethers 3 and 4 such that a space is present below resonating element 2. Tethers of any suitable length may be used, and may be in the range of 1 μm, 10 μm, 20 μm, 30 μm, 100 μm or 300 μm in length, and may have about the same height as resonator element 2, in some embodiments. FIG. 1, shows that support tethers 3 and 4 are connected to anchors 7 and 8. Accelerometer 1 may also include an electrode 5 configured to capacitively drive resonating element 2 into a bulk acoustic mode of vibration, and an electrode 6 configured to capacitively sense a measured signal from the resonating element 2. Resonator element 2 may be separated from capacitive electrodes 5 and/or 6 by very small gap(s) d, which may be approximately 100 nm to 200 nm in width, for example. For example, gap d may be less than about 200 nm. When the resonator element is in its equilibrium position and no external acceleration is applied. Gap d may be along the y-axis direction as illustrated in FIG. 1, and for purposes of illustration, FIG. 1 shows the gap d as being in the y-axis direction. However, the gap d need not necessarily be along the y-axis dimension to sense y-axis acceleration. For example, one or both the resonator element and electrode may have overlapping extensions that extend over and/or to the side of the electrode and/or resonator, such that the smallest gap between the resonator element 2 and an electrode may be their displacement from one another in the x-axis and/or z-axis directions.

Electrode 5 may be connected to an oscillator (not shown) which generates a drive signal that is applied to electrode 5 to excite vibration of a bulk acoustic wave resonance in resonator element 2, at its resonant frequency. The resonant frequency for the bulk acoustic mode may be relatively high, and may be between 1 MHz and 50 MHz, such as about 10 MHz, for example. The mechanical stiffness $K_m$ associated with this mode may be relatively large. FIGS. 2A and 2B show simulation results illustrating the vibration of resonator element 2 in a bulk acoustic wave mode. FIG. 2A shows resonating element 2 during a first portion of a period of the vibration, in which the middle portions of the resonator element 2 between the tethers are contracted in the x-y plane towards the center of the resonator element 2. FIG. 2B shows resonating element 2 during a different portion of the period of the vibration, in which the middle portions of the resonator element. 2 are expanded in the x-y plane such that they are bowed away from the center of the resonator element 2. Such a bulk acoustic wave mode may be characterized by expansions and contractions of resonator element 2 in the x-y plane. The center of resonator element 2 and the tethers may not move as a result of driving the resonator element 2 in the bulk acoustic wave mode. In other words, the bulk acoustic resonance mode may not induce any substantial translation resonator element. The bulk acoustic wave modes can exhibit high Quality factors (Q) in the order of 1000 to 100,000 or even higher at atmospheric or sub-atmospheric surrounding gas pressure, which may simplify packaging the accelerometer because costly low-pressure vacuum packaging may not be necessary. In some embodiments, the accelerometer can be packaged in air at atmospheric pressure, or sub-atmospheric pressures of 1 torr or higher.

With respect to FIG. 1, when an external acceleration $a_y$ is applied that has a component in y-axis direction, the external acceleration may cause the resonator element 2 to be displaced in the y-axis direction closer to electrode 5. This displacement of resonator element 2 changes the gap spacing d between the resonator element 2 and the electrodes 5 and 6. The resonating element 2 may continue to vibrate in a bulk acoustic wave mode, with the resonating element now being in a position closer to electrode 5. This acceleration-induced change in the gap spacing d may cause a change in the electrical spring constant $K_e$ of the electromechanical system, due to the higher capacitive coupling caused by reducing the distance d between the resonator element and electrode 5. As discussed above, such a change in the electrical spring constant $K_e$ can cause a change in the resonance frequency of the electromechanical system and/or other parameters. In some embodiments, a change in resonance frequency may be measured to sense the external acceleration applied to the accelerometer. However, other ways of measuring the acceleration are possible besides measuring the change in resonance frequency, such as measuring a phase change in a signal received from the electromechanical system. Such a phase change may be a very sensitive function of small displacements of the proof mass with respect to the electrodes due to the high Q of the bulk acoustic resonant mode. Any other suitable parameter that reflects or is a result of the change in $K_e$ can be measured to sense the externally-applied acceleration.

Direct frequency output of the sensor may be connected to digital circuitry and measured to a high precision. The resolution with which a change in the output frequency can be measured may depend on the quality factor Q of the resonant mode. The use of the bulb acoustic mode of the proof mass may provide for a very high Q (>1000) in air or moderate vacuum, which may result in a high resolution sensor without needing high vacuum.

The measurement of the change in resonant frequency, or any other suitable parameter(s) can be performed in a variety of ways. In some embodiments, a signal can be measured from electrode 6 which is also electrically coupled to resonator element 2. Electrode 6 may detect a measurement signal that can be processed by electrical circuitry coupled to electrode 6 to detect motion based on a change in the resonant frequency or another parameter. In some embodiments, the phase shift may be a more sensitive way to detect motion than detecting a change in resonant frequency. However, another parameter may be used, such as voltage magnitude, current magnitude, as the invention is not limited as to a particular measurement technique. In some embodiments, a measurement signal can be detected from the resonator element itself by way of an electrical connections through a tether 3 and/or 4, and an anchor 7 and/or 8, with the anchor or other electrical element coupled to the tether serving as a detection electrode that provides a measurement signal to measurement circuitry. Such an embodiment is discussed in further detail below with respect to FIG. 5.

The components of accelerometer 1 can be formed of any of a variety of materials. In some embodiments, accelerometer 1 may be a micromachined accelerometer (e.g., a microelectromechanical system) that is formed using an integrated circuit manufacturing process, or another suitable process for forming microelectromechanical systems (MEMS). Resonator element 2 may have release holes formed therein to enable etching of the underlying material to release the suspended structure. The resonating element, tethers, anchors, and/or electrodes may be formed of a semiconductor, such as single crystal silicon or polycrystalline silicon. However, any other suitable materials may be used, as the invention is not limited in this respect. One suitable substrate for implementation of the BAW accelerometer is a silicon-on-insulator substrate, although regular silicon substrate can be used, or another type of substrate.

Figure 3:
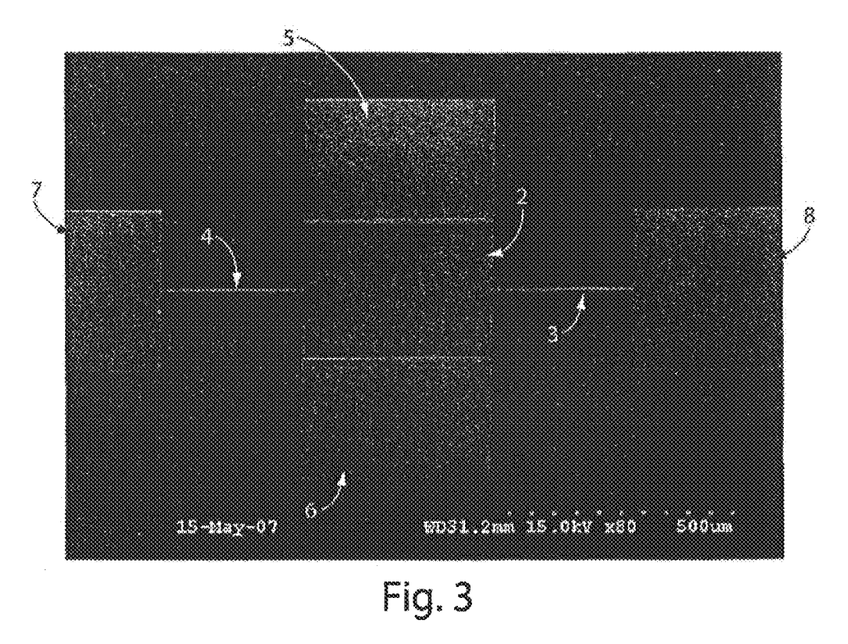
FIG. 3 shows a scanning electron microscope image of a accelerometer formed in a microfabrication process, according to some embodiments.

FIG. 3 shows a scanning electron microscope (SEM) image of an accelerometer 1 that was formed using a micromachining manufacturing process, in which the resonating element 2 was formed of single crystal silicon.

Using accelerometer 1 illustrated in FIG. 1, the component of acceleration $a_y$ along a first axis (e.g., y axis) can be measured. To measure acceleration along a second axis that is perpendicular to the first axis (e.g., x axis), a second resonator element can be used with associated tethers, anchors, and electrode(s) such as those illustrated in FIG. 1, yet oriented in a direction that is shifted by 90° so as to detect acceleration along the x-axis. In some applications, it may be desirable to use a 3-axis accelerometer that can measure acceleration along all three axes (x, y and z).

Figure 4:
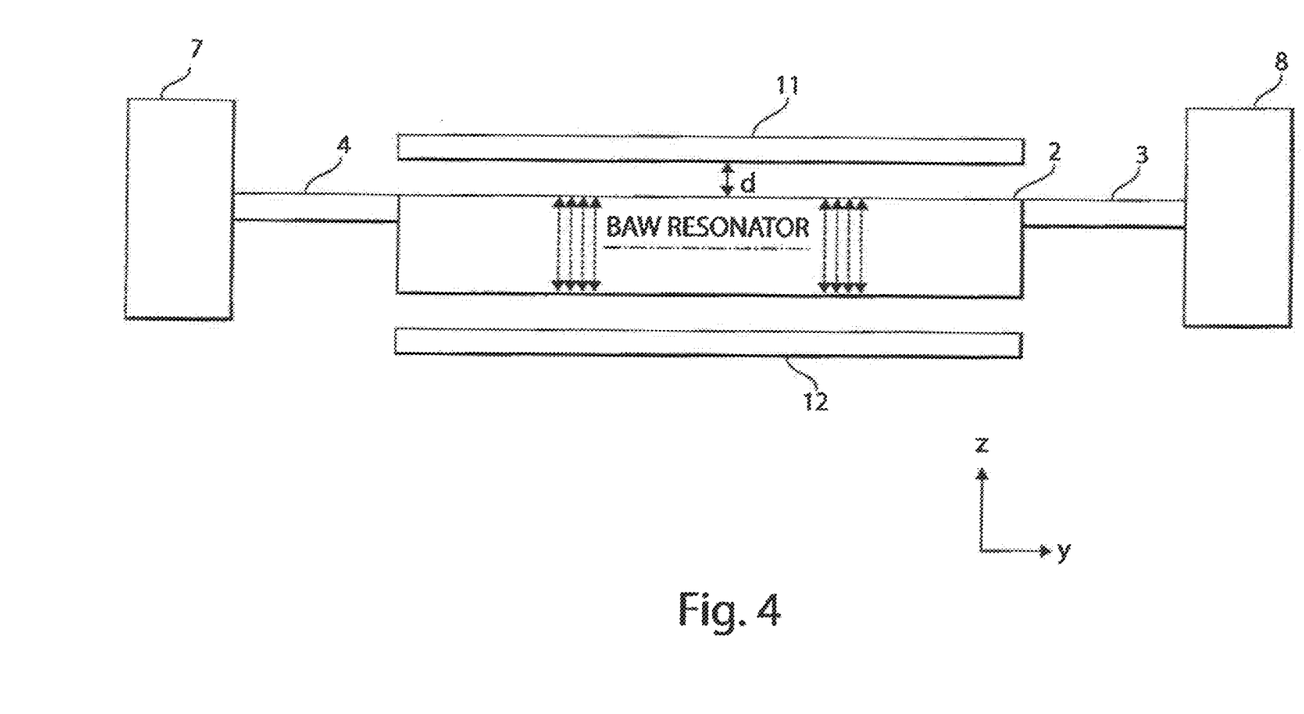
FIG. 4 shows a side view of an accelerometer that can measure acceleration in the z-axis direction, according to some embodiments.

FIG. 4 shows an example of an accelerometer that can sense acceleration in the z-axis direction, according to some embodiments. To sense acceleration in along the z-axis, an electrode can be formed above and/or below resonating element 2, and separated from resonating element 2 by a gap d. For example, as shown in FIG. 4, a parallel top electrode 11 and/or bottom electrode 12 can be used to drive the resonator element to vibrate in the z-axis direction in a bulk acoustic wave mode of vibration. Z-axis acceleration can be measured using any suitable technique such as those described herein. Electrodes 11 and 12 may be made from polysilicon or another material, such as a metal. One or more supporting tethers 3 and 4 can be used with mechanical compliance in the z-axis direction. The tethers 3 and 4 may be made from polysilicon or another material such as metal (e.g., aluminum or nickel).

Figure 5:
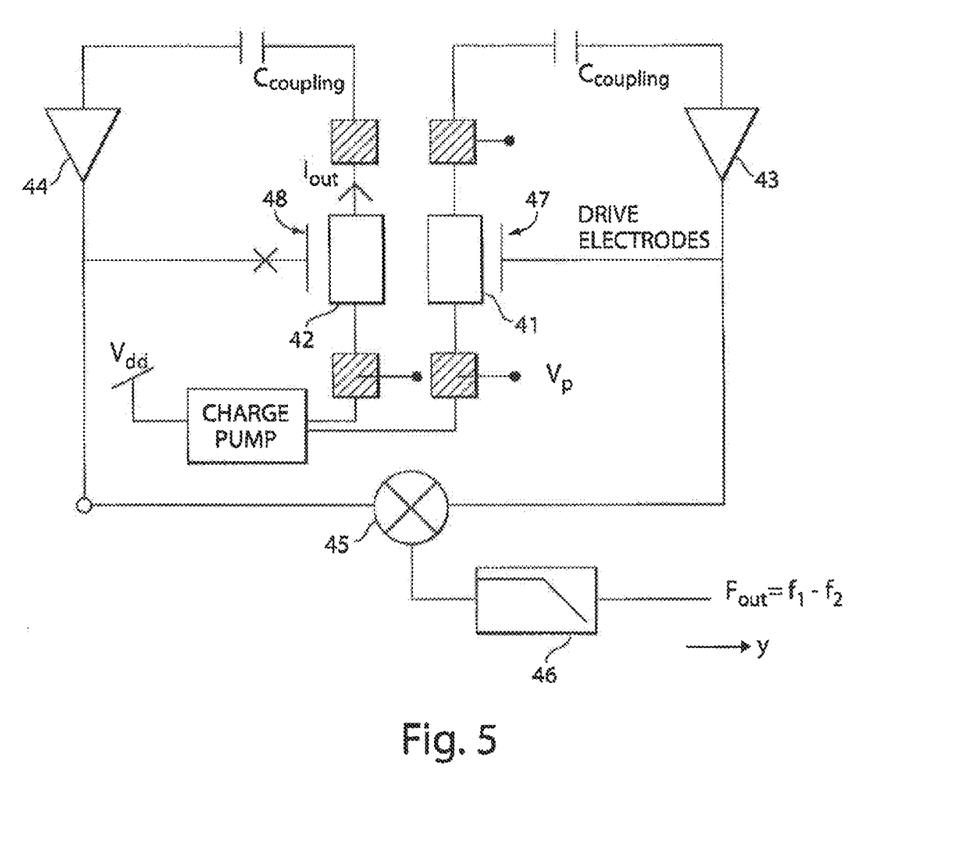
FIG. 5 shows a diagram of a circuit for differentially measuring acceleration.

FIG. 5 shows an embodiment of a differential bulk acoustic wave accelerometer and supporting measurement electronics for sensing acceleration along a first axis. In this embodiment, two bulk acoustic wave resonator elements 41 and 42 are used in a differential configuration. Electrode 47 is used to capacitively drive resonator element 41 into a bulk acoustic wave mode, with electrode 47 being positioned on the right side of resonator element 41, as shown in FIG. 5. Electrode 48 is used to capacitively drive resonator element 42 into a bulk acoustic wave mode of vibration, with electrode 48 being positioned on the left side of resonator element 42. Acceleration in the y-axis direction may cause resonator element 41 to be shifted closer to its drive electrode 47 and resonator element 42 to be shifted farther away from its drive electrode 48.

A differential read-out can be used, such that first order common-mode variations caused by temperature can be cancelled out. As illustrated in FIG. 5, each of these resonator elements 41 and 42 may be used in the single-electrode configuration, in which each resonator element has an associated drive electrode, and a sense electrode 6 need not be used. In the example illustrated in FIG. 5, drive voltages can be applied to the drive electrodes, and a sense current may be read out of the body of the resonator via the anchors. Trans-Impedance amplifiers 43 and 44 amplify the sense current and the two differential output voltages are multiplied by a mixer 45 and sent through a low-pass filter 46. The shift in the resonant frequency can be provided as an output, and the acceleration can then be calculated based on this output signal. One example of a measurement configuration is shown in FIG. 5 with associated circuitry, however this is just one example, and any other suitable measurement configurations or circuitry may be used.

Acceleration along the y-axis direction may cause the bulk acoustic wave resonant frequency of one of the resonator elements 41 or 42 to increase, and the resonant frequency of the other one of resonator elements 41 or 42 to decrease. The increase in the resonant frequency of one of the resonators may be approximately the same as the decrease in the resonant frequency of the other resonator (assuming the two capacitive bulk acoustic resonators operate in their linear range). This differential mode of operation may result in a two times larger frequency shift due to the acceleration than would be the case in a non-differential mode of operation. Common-mode frequency drift resulting from a change in the mechanical stiffness or mass of the bulk acoustic wave resonators (for example, caused by temperature) may be subtracted out as a result of the differential mode of operation, such that this frequency drift does not appear in the output frequency $F_{out}$.

Figure 6:
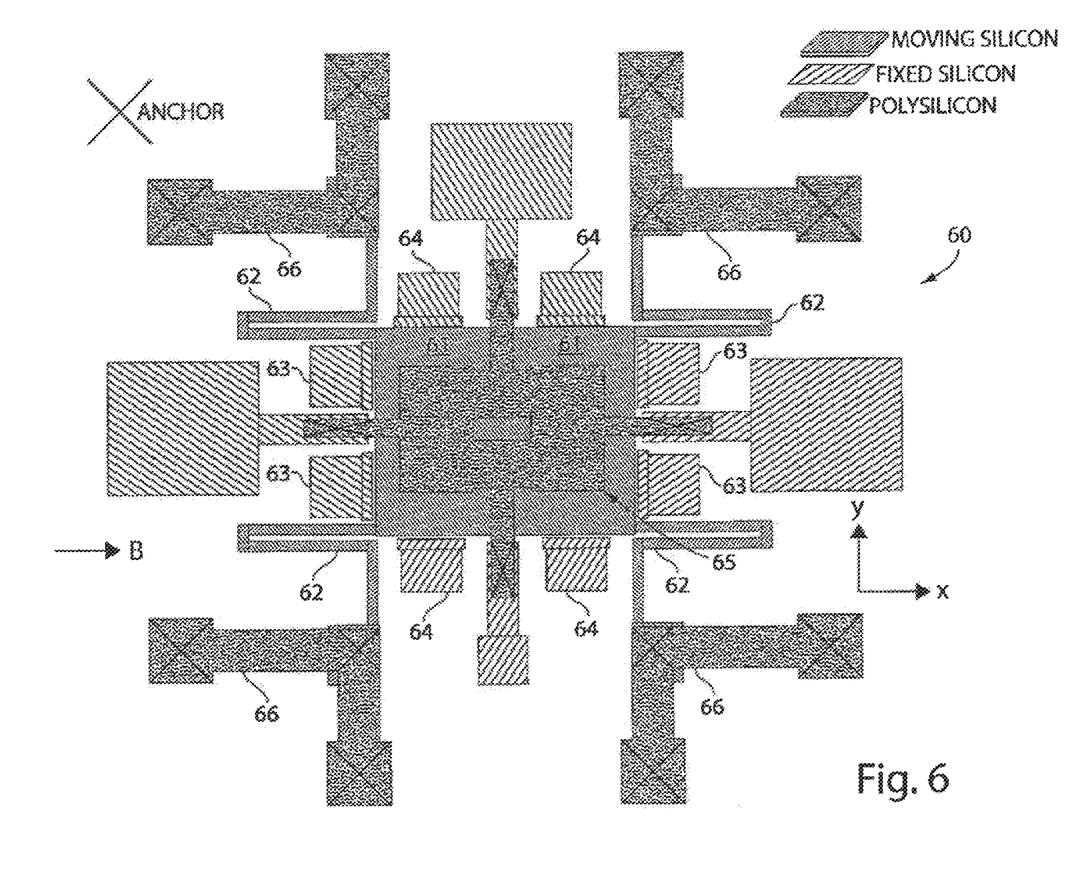
FIG. 6 shows an embodiment of a "static" accelerometer.

FIG. 6 shows an embodiment of another accelerometer 60. Accelerometer 60 may be considered to be in the "static" category of accelerometers above, which are not intentionally driven into a resonance mode like resonant accelerometers. Accelerometer 60 may be a 3-axis accelerometer that can sense acceleration in the x, y and z-axes. As shown in FIG. 6, accelerometer 60 has a proof mass 61 that may be suspended above a substrate by a suspension system that includes x-y axis suspension members and z-axis suspension members. Proof mass 61 may be formed of single-crystal silicon or any other suitable material.

As shown in FIG. 6, proof mass 61 may be suspended by x-y axis suspension tethers 62, and z axis suspensions tethers 66, such that the x-y axis suspension tethers are mechanically anchored to the z-axis suspension tethers. The x-y axis suspension tethers may not exhibit any substantial bending in the z axis acceleration compared to the z-axis suspension tethers. Similarly, the z axis suspension tethers may not exhibit any substantial bending in the x-axis or y-axis compared to x-y axis suspension tethers. The z-axis suspension tethers may have an L-shape as shown in FIG. 6, or any other suitable shape. In some embodiments, the z-axis suspension tethers may be substantially flat and thin, and may have a thickness of less than about 3 μm. The z-axis suspension tethers may be formed of polysilicon or another suitable material. The x-y axis suspension tethers may have a larger height (e.g., greater than 10 μm) than the z-axis suspension tethers in the z-axis direction, so that the x-y suspension tethers do not have any substantial compliance in the z-axis direction. As shown in FIG. 6, the x-y suspension tethers may have a folded shape, however, any other suitable shape may be used as shown in FIG. 6, an x-y axis suspension tethers 62 may be connected to a z-axis suspension tether the elbow (i.e., corner) the L-shaped z-axis suspension tether 66.

Acceleration may be capacitively sensed in the x-axis direction and the y-axis direction by one or more x-axis electrodes 63 and y-axis electrodes 64, respectively, which are formed to the side of proof mass 61. A z-axis electrode 65 may be formed above proof mass 61 to sense z-axis acceleration. These electrodes may serve as shock stops to prevent the plastic deformation or breakage of the suspensions. The electrodes may be displaced from proof mass 61 by very small gaps d, such that the gap size may be less than about 200 nm when the proof mass is in its equilibrium position (i.e., when no external acceleration is applied). The suspensions 62 and 66 may be relatively rigid, so that the proof mass does not move more than about 200 nm.

In some embodiments, accelerometer 60 may be formed on the silicon device layer of an SOI (silicon-on-insulator) substrate, DRIE (deep reactive ion etching) of the silicon device layer of the SOI wafer may be used to form the accelerometer, combined with polysilicon surface micromachining to form the electrodes 63, 64, and 65. The small gap d for the x, y or z electrodes may be formed by a thin layer of a sacrificial material such as silicon dioxide that is removed at a later stage of the process flow. Proof mass 60 may be formed by backside DRIE, in some embodiments. The z-axis sense electrode 65 and suspensions 62 may be formed from doped polysilicon by surface micromachining.

Figure 7:
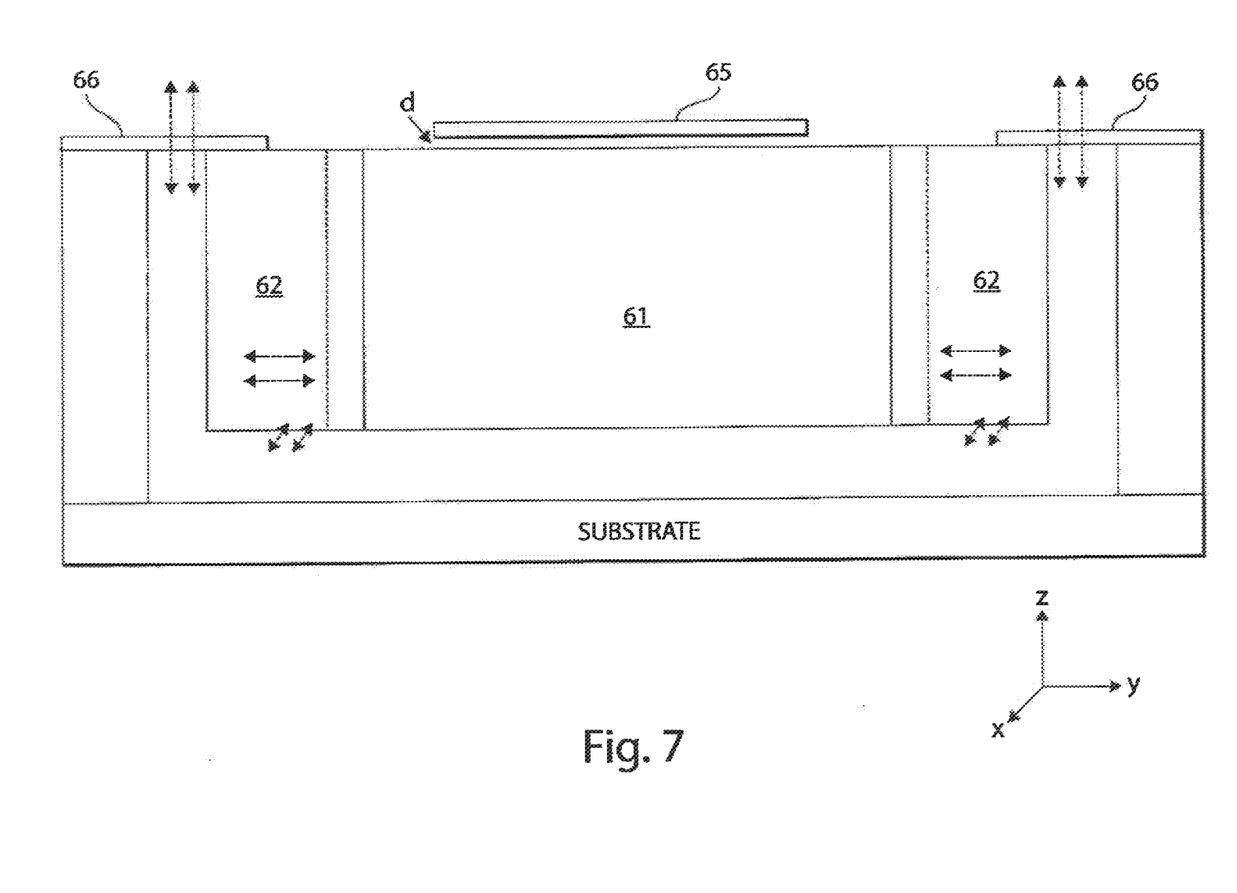
FIG. 7 shows a cross sectional view of the accelerometer illustrated in FIG. 6.

FIG. 7 shows a side view of the accelerometer 60 along the direction of arrow B shown in FIG. 6. For clarity, some portions of accelerometer 60 are not shown in FIG. 7, such as x-axis electrodes 63. As shown in FIG. 7, the proof mass 61 is suspended by a suspension system that includes both z-axis suspension tethers 66, and x-y suspension tethers 62. Suspension tethers 66 may be rigidly mechanically connected to x-y suspension tethers 62. A z-axis sense electrode 65 may be formed above proof mass 61, and may be separated from proof mass 61 by a very small gap d. In FIG. 7, sets of arrows illustrate the movement of the z-axis suspension tethers in the z-axis direction, and the x-y axis suspension tethers in the y-axis direction and the x-axis direction.

Figure 8:
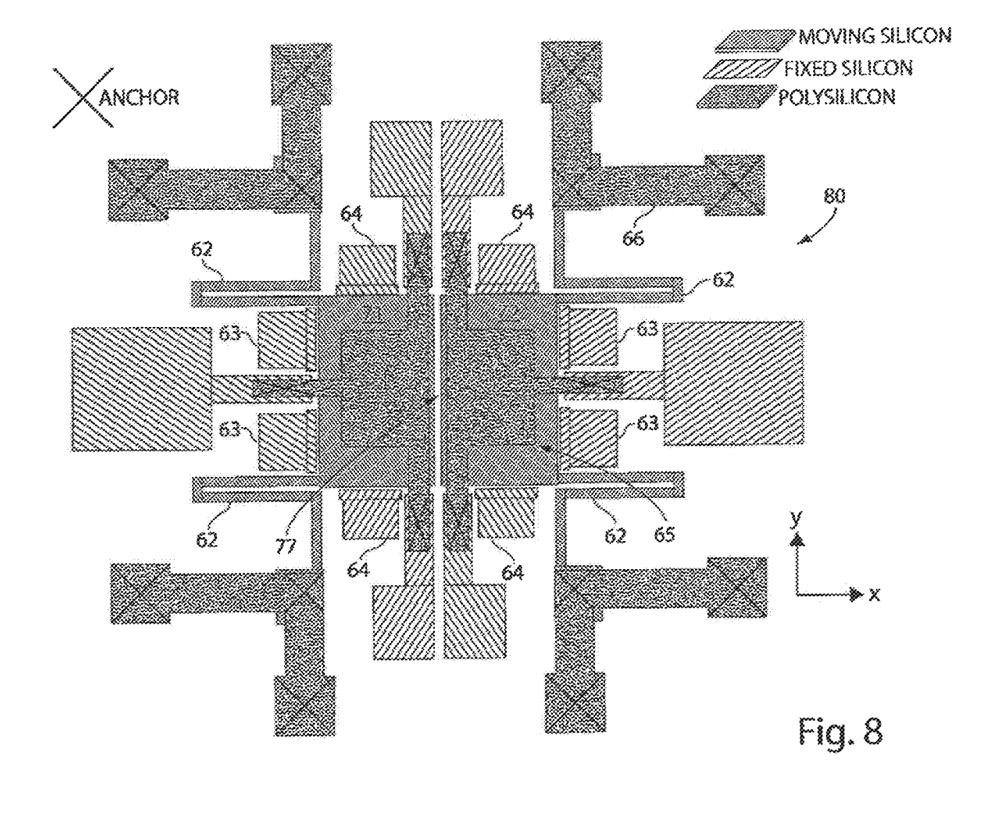
FIG. 8 shows another embodiment of a bulk acoustic wave accelerometer that can operate in a differential mode.

FIG. 8 shows an embodiment of another bulk acoustic wave accelerometer 80, according to some embodiments. Accelerometer 80 may operate as a 3-axis bulk acoustic wave accelerometer system in a differential mode of operation. One or more bulk acoustic waves can be excited in x, y and/or z directions by capacitive electrode(s) in the proof masses 71 and 72 of the accelerometer 80. The two proof masses 71 and 72 may be mirror copies of each other and may be separated by a vertical trench 77 to create a differential multi-axis bulk acoustic wave accelerometer system that may operate differentially in similar manner the system illustrated in FIG. 5. Sensing may be performed by way of separate sense electrode such as sense electrode 6, or using a signal detected from the resonator element itself, as in the embodiment of FIG. 5. The width of the trench 77 may be less than a micrometer or a few micrometers (for example, 2 or 3 micrometers). The suspension tethers shown in FIG. 8 are exemplary, as a three-axis bulk acoustic wave accelerometer invention is not limited to the particular shapes or dimensions of the suspension tethers.

In some embodiments, additional electrode(s) may be created underneath the proof mass(es) to enable a differential operation of the bulk-acoustic wave accelerometer in the z direction. Such electrode may be similar in shape and position to electrode 65.

Although resonator elements 61, 71 and 72 are shown in FIGS. 6-8 as having a square or rectangular shape, the resonator elements are not limited to having a square or rectangular shape. Alternatively, the resonator may have a curved, circular or disk-like shape, in some embodiments. The shapes and/or positions of the electrodes and other features may be adapted to the shape of the resonator.

Discussion of BAW Operation

The theory of operation of accelerometer 1 will now be discussed in further detail. A relationship for the sensitivity of the accelerometer can be developed by first considering the change in the gap spacing d due to a transverse acceleration in the y direction. This acceleration is inversely proportional to the flexural stiffness of the accelerometer, which is affected by the dimensions of the support tethers 3, 4.

$$\frac{\partial f_{electromechanical}}{\partial a} = \frac{\partial f_{electromechanical}}{\partial d} \frac{\partial d}{\partial a}$$

An externally applied acceleration ($a_y$) causes the resonator element to shift closer to the electrode 5 and decreases the gap spacing, d, on one side of resonating element 2, while increasing the gap spacing for electrode 6 on the opposite side of resonating element 2. The support tethers each have an associated stiffness given by $k_1$ and $k_2$. If the two tethers are have the same dimensions and are formed of the same material, then $k_1=k_2$. The proof mass can be modeled as a $2^{nd}$-order mass spring damper system with spring constant, $K_{EFF}$, damping, D, and mass, M. The two support tethers 3, 4 have dimensions given by $l_t$, $w_t$, and $h_t$. Due to the direction of motion of the proof mass, the transverse stiffness of the tethers is given by:

$$K_{flexure} = 2K_{tethers} = \frac{2Ew_{tether}^3 h_{tether}}{L_{tether}^3}$$

The proof mass motion can be modeled using a second order mass-damper-spring system model.

Using F=ma, the external force applied to the resonating element is:

$$F_{ext\_on\_mass} = M_{proofmass} \frac{d^2 y_2}{dt^2} = M_{proofmass} \frac{d^2 (y+y_1)}{dt^2}$$

The spring force applied by the tethers:

$$F_{spring} = K_{flexure} y + D\frac{dy}{dt}$$

The two forces balance each other $$F_{spring} = -F_{ext\_on\_mass}$$

$$K_{flexure} y + D\frac{dy}{dt} = -M_{proofmass}\frac{d^2(y+y_1)}{dt^2}$$

$$M_{proofmass}\frac{d^2 y}{dt^2} + D\frac{dy}{dt} + K_{flexure} y = -M_{proofmass}\frac{d^2 y_1}{dt^2}$$

The acceleration to be measured is denoted by 'a':

$$F_{ext} = M_{proofmass}\frac{d^2 y}{dt^2} + D\frac{dy}{dt} + K_{flexure} y = aM_{proofmass}$$

The differential equation in terms of the acceleration to be measured:

$$a = \frac{d^2 y}{dt^2} + \frac{D}{M_{proofmass}}\frac{dy}{dt} + \frac{K_{flexure}}{M_{proofmass}} y$$

Taking the Laplace Transform to get the transfer function for the displacement vs. the externally applied acceleration:

$$H(j\omega) = \frac{Y(j\omega)}{A(j\omega)}$$

$$= \frac{1}{(j\omega)^2 + \frac{D}{M_{proofmass}}(j\omega) + \frac{K_{flexure}}{M_{proofmass}}}$$

$$= \frac{1}{\left(\frac{K_{flexure}}{M_{proofmass}} - \omega^2\right) + j\left(\frac{D}{M_{proofmass}}\omega\right)}$$

Static devices may operate well below the resonant frequency and the transfer friction amplifies to:

For $\omega \ll \omega_n$:

$$|H(j\omega)| = \frac{M_{proofmass}}{K_{flexure}} = \frac{1}{\omega_{flexure}^2}$$

The change in the resonant frequency, $f_{electromechanical}$, of the resonator element in Bulk Acoustic Mode can be calculated using a simple resonator model. Using a simple resonator model, the resonance frequency for the width-extensional mode for a homogeneous BAW resonator can be derived as follows. The simple resonator model that is developed for the infinite plate or long thin rod can be used to model the Harmonic Mechanical Resonance Spectrum. The frequency at mode n is given by:

$$f_n = \frac{n}{2l}\sqrt{c/\rho}$$

$f_n$ is the natural bulk acoustic frequency, where n is the harmonic number, l is the frequency determining dimension, c is the effective elastic stiffness constant. For the case of a plate, the shear stiffness constant in thickness direction is used, while for the case of the thin rod, Young's Modulus is used. Finally, $\rho$ is the mass density of the resonator material.

For the case of the BAW resonator, the width is the resonance determining dimension and thus, the BAW fundamental resonance frequency is given by the following relationship.

$$f_{BAW} = \frac{1}{2W}\sqrt{\frac{E}{\rho}}$$

The relationship for the BAW stiffness constant can now be derived using the following relationship between the resonant frequency and the mass of the system.

$$\omega_{BAW} = \sqrt{\frac{K_{BAW}}{M_{proofmass}}}$$

The resulting BAW stiffness is given by $$K_{BAW} = \frac{\pi^2 E l h}{w}$$

When an electrostatic force is exerted on the device via a capacitive transducer, it can be modeled by a second order system using the bulk-acoustic wave stiffness constant $$F_{electrostatic} = M_{proofmass}\frac{d^2 y}{dt^2} + D\frac{dy}{dt} + K_{BAW} y$$

The energy stored in a capacitor is given by $$E_{capacitor} = \frac{1}{2}CV^2$$

The electrostatic force is related to the energy stored in the capacitor given by $$F_{electrostatic} = \frac{\partial E}{\partial y} = \frac{1}{2}V^2\frac{\partial C}{\partial y}$$

The voltage to be applied consists of a constant polarization (d.c.) voltage and a drive (a.c.) voltage.

$$V_{applied} = V_{dc} + V_{ac}$$

Let Co denote the rest capacitance of the resonator $$C_o = \frac{\varepsilon A}{d}$$

Then C, the capacitance of the resonator, is as follows:

$$C = \frac{\varepsilon A}{d - y} = \frac{C_o}{1 - \frac{y}{d}}$$

The derivative of the capacitance with respect to distance can be approximated by a Taylor series expansion and is given by $$\frac{\partial C}{\partial y} = \frac{C_o}{d\left(1 - \frac{y}{d}\right)^2} = \frac{C_0}{d}\left(1 + \frac{2}{d}y + \frac{3}{d^2}y^2 + \ldots\right)$$

The following approximation is only valid if y/d is $\ll 1$ $$\frac{\partial C}{\partial y} \approx \frac{C_o}{d}\left(1 + \frac{2}{d}y\right)$$

By using these relationships, the electrostatic force can be related to the polarization voltage and the capacitance given by $$F_{electrostatic} = \frac{1}{2}(V_p + V_{ac})^2\frac{\partial C}{\partial y} = \frac{1}{2}\left(\begin{matrix}V_p^2 + \\ 2V_p V_{ac} + V_{ac}^2\end{matrix}\right)\frac{C_o}{d}\left(1 + \frac{2}{d}y\right)$$

$$F_{electrostatic} \approx \frac{1}{2}V_p^2\frac{C_o}{d} + V_p V_{ac}\frac{C_o}{d} + V_p^2\frac{C_o}{d^2}y$$

By substituting the electrostatic force into the second order mass-spring damper system, the following relationship is derived given by $$M_{proofmass}\frac{d^2 y}{dt^2} + D\frac{dy}{dt} + \left(K_{BAW} - V_p^2\frac{C_o}{d^2}\right)y = \frac{1}{2}V_p^2\frac{C_o}{d} + V_p V_{ac}\frac{C_o}{d}$$

The electromechanical stiffness is a combination of the bulk acoustic wave stiffness and the electrical stiffness; $K_{electromechanical} = K_{BAW} - K_{electrical}$, where an expression for the electrical stiffness is given by $$K_{electrical} = V_p^2\frac{C_o}{d^2}$$

Using these relations, the overall transfer function of displacement vs. applied drive voltage is given by $$M_{proofmass}s^2 Y(s) + DsY(s) + \left(K_{BAW} - V_p^2\frac{C_o}{d^2}\right)Y(s) + V_p\frac{C_o}{d}V(s)$$

$$H(s) = \frac{Y(s)}{V(s)} = \frac{V_p\frac{C_o}{d}}{M_{proofmass}s^2 + Ds + \left(K_{BAW} - V_p^2\frac{C_o}{d^2}\right)}$$

The overall electromechanical resonance frequency depends on the applied voltage by $$\omega_{electromechanical} = \sqrt{\frac{K_{electromechanical}}{M_{proofmass}}}$$

$$= \sqrt{\frac{K_{BAW} - V_p^2\frac{C_o}{d^2}}{M_{proofmass}}}$$

$$= \omega_{BAW}\sqrt{1 - \frac{V_p^2 C_o}{K_{BAW} d^2}}$$

$$f_{electromechanical} = f_{BAW}\sqrt{1 - \frac{V_p^2 C_o}{K_{BAW} d^2}} = f_{BAW}\sqrt{1 - \frac{V_p^2 \varepsilon A}{K_{BAW} d^3}}$$

By taking the derivative of the electromechanical resonance frequency with respect to the gap spacing and combining with the flexural mode transfer function, the overall sensitivity can be derived and is given by Taylor Series Expansion on $$\frac{1}{\sqrt{1 - \frac{V_p^2 \varepsilon A}{K_{BAW} d^3}}}$$

to simplify the expression:

$$f(x) = \frac{1}{\sqrt{1-x}}$$

$$p(x) = \sum_{n=0}^{\infty} \frac{f^{(n)}(0)}{n!} x^n$$

$$f'(x) = \frac{\frac{1}{2}}{(1-x)^{\frac{3}{2}}} \quad f'(0) = \frac{1}{2}$$

$$f''(x) = \frac{-\frac{3}{4}}{(1-x)^{\frac{3}{2}}} \quad f''(0) = \frac{-3}{4}$$

$$f'''(x) = \frac{\frac{15}{8}}{(1-x)^{\frac{7}{2}}} \quad f'''(0) = \frac{15}{8}$$

$$p(x) \approx 1 + \frac{x}{2}$$

Using only up until the 1st order terms:

$$\frac{1}{\sqrt{1 - \frac{V_p^2 \varepsilon A}{K_{BAW} d^3}}} \approx 1 + \frac{V_p^2 \varepsilon A}{2 K_{BAW} d^3}$$

Substituting:

$$\frac{\partial f_{electromechanical}}{\partial d} = f_{BAW} \frac{1}{2}\left(1 + \frac{V_p^2 \varepsilon A}{2 K_{BAW} d^3}\right) \frac{3 V_p^2 \varepsilon A}{K_{BAW} d^4}$$

Finally, the overall sensitivity of the device may be given by the following relationship:

$$\frac{\partial f_{electromechanical}}{\partial a} = \frac{1}{\omega_{flexure}^2} \frac{f_{BAW}}{2}\left(1 + \frac{V_p^2 \varepsilon A}{2 K_{BAW} d^3}\right) \frac{3 V_p^2 \varepsilon A}{K_{BAW} d^4}$$

Since the sensitivity of the accelerometer can be proportional to the fourth order of the gap spacing, this technique can enable very high sensitivity.

Having now described some illustrative embodiments of the invention, it should be apparent to those skilled in the art that the foregoing is merely illustrative and not limiting, having been presented by way of example only. Numerous modifications and other illustrative embodiments may be contemplated by those of ordinary skill in the art and are believed to fall within the scope of the invention. In particular, many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first," "second," "third," etc. in the claims to modify a claim element or item in the specification does not by itself connote any priority, presence or order of one element over another or the temporal order in which acts of a method are performed. Rather, these ordinal terms are used merely as labels to distinguish one element having a certain name from another element having a same name, but for the use of the ordinal term, to distinguish the elements.

What is claimed is:

1. A method of measuring motion using an electromechanical resonator having a resonant frequency and an electrical spring constant, the electromechanical resonator comprising a resonator element, the method comprising:
    driving the resonator element to vibrate along a first axis in a bulk acoustic resonance mode at a resonant frequency, the resonator element suspended by a suspension member configured to vibrate in a flexural mode; and
    measuring motion along the first axis based on a change in the electrical spring constant of the electromechanical resonator.

2. The method of claim 1, wherein motion is detected based on a change in the resonant frequency of the electromechanical resonator.

3. The method of claim 1, wherein the electromechanical resonator has a mechanical spring constant that is a substantially fixed.

4. The method of claim 1, wherein the resonant frequency is higher than about 1 MHz.

5. The method of claim 1, wherein the motion is measured according to the phase of a signal provided by the electromechanical resonator.

6. A method of measuring motion using an electromechanical resonator, the method comprising:
    providing an accelerometer comprising resonator element configured to vibrate along a first axis in a bulk acoustic wave mode at a resonant frequency, the resonator element being suspended by a suspension member and having a variable electrical spring constant that depends on a size of a capacitive gap between the resonator element and at least one electrode, the suspension member having a dimension substantially different than that of the resonator element, the one electrode configured to sense a change in a parameter value tied to a change in the electrical spring constant and to provide an output signal therefor; and
    sensing with the one electrode a change in the parameter value tied to a change in the electrical spring constant; and
    deriving an acceleration determination signal from an output of the one electrode.

7. A method of measuring motion using an electromechanical resonator, the method comprising:
    providing an accelerometer comprising a resonator element having a resonant frequency of at least about 1 MHz and configured to vibrate along a first axis, the resonator element being suspended by a suspension member and having a variable electrical spring constant that depends on a size of a capacitive gap between the resonator element and a first electrode, the suspension member having a dimension substantially different than that of the resonator element;

sensing with the first electrode a change in a parameter value tied to a change in the electrical spring constant and providing an output signal therefor; and determining with an acceleration determination module an amount of external acceleration applied to the accelerometer based on the output signal provided by the first electrode.

8. A method of measuring motion using an electromechanical resonator, the method comprising:

providing a resonator element comprising a proof mass suspended by a suspension member and allowing separation of the proof mass from a drive electrode by a capacitive gap and driven by the drive electrode to vibrate along a first axis in a bulk acoustic resonance mode at a resonant frequency, the suspension member having dimensions substantially different than the proof mass and configured to vibrate in a flexural mode, the resonator element having a variable electrical spring constant that depends on a size of a capacitive gap between the resonator element and a first electrode, applying a polarization voltage between the resonator element and the first electrode;

sensing with a parameter electrode a change in a parameter value tied to a change in the electrical spring constant; and deriving an acceleration determination signal from an output of the one electrode.

* * * * *